United States Patent
Bantwala et al.

(10) Patent No.: US 8,010,456 B2
(45) Date of Patent: Aug. 30, 2011

(54) POLICY BASED APPLICATION PROVISIONING IN A COLLABORATIVE COMPUTING ENVIRONMENT

(75) Inventors: Mustansir Bantwala, Hudson, NH (US); Miguel A. Estrada, Hollis, NH (US); Charles R. Hill, Belmont, MA (US); Sami M. Shalabi, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 2607 days.

(21) Appl. No.: 10/745,098

(22) Filed: Dec. 22, 2003

(65) Prior Publication Data

US 2005/0216381 A1 Sep. 29, 2005

(51) Int. Cl.
*G06F 17/00* (2006.01)
(52) U.S. Cl. ............................................ 705/51; 705/67
(58) Field of Classification Search .................... 705/50, 705/51, 67
See application file for complete search history.

(56) References Cited

U.S. PATENT DOCUMENTS

| | | | | |
|---|---|---|---|---|
| 5,247,575 A | * | 9/1993 | Sprague et al. | 705/53 |
| 5,502,766 A | * | 3/1996 | Boebert et al. | 713/193 |
| 5,715,403 A | * | 2/1998 | Stefik | 705/44 |

* cited by examiner

*Primary Examiner* — Calvin L Hewitt, II
*Assistant Examiner* — John M Winter
(74) *Attorney, Agent, or Firm* — Steven M. Greenberg, Esq.; Carey, Rodriguez, Greenberg & Paul

(57) ABSTRACT

The present invention is a method, system and apparatus for the policy based provisioning and management of a collaborative context. A policy based application provisioning system for use in a collaborative environment can include a policy having rules for limiting collaborative context creation and operation in the collaborative environment. A context provisioning process can be coupled to the policy and configured to create collaborative contexts in the collaborative environment limited by the rules in the policy. Finally, a context management process can be coupled to a data store of usage data for created ones of created collaborative contexts in the collaborative environment.

24 Claims, 4 Drawing Sheets

POLICY BASED APPLICATION PROVISIONING IN A COLLABORATIVE COMPUTING ENVIRONMENT

BACKGROUND OF THE INVENTION

1. Statement of the Technical Field

The present invention relates to the field of collaborative computing and more particularly to managing the provisioning and lifecycle of logical components in a collaborative content.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include document libraries, instant messaging, discussion forums (chat rooms), and application sharing.

Conventional collaborative computing includes combinations of collaborative technologies in order to provide a means for members of a collaborative community to pool the strengths and experiences of the collaborators to achieve a common goal. A collaborative computing environment generally can be defined by (1) a particular context, specifically the objective of the environment, (2) membership, specifically the participants in the environment, (3) a set of roles for the members, and (4) resources and tools which can be accessed by the membership in furtherance of the objective of the environment. Roles are names given to the people in the environment which dictate access to the resources and tools within the environment as well as define the behavior of the community members.

Collaborative computing environments typically can be customized by the developer of each environment in order to meet the needs both of developers and users. For instance, several customized collaborative computing environments have been created such as team workspaces, e-meetings, virtual classrooms and virtual communities. Notably, each of these types of environments has been implemented using shared resources as a building block to create the environment. Nevertheless, customized collaborative computing environments can be rigid and immutable due to their customization.

Self-service applications and end user self-provisioning are at the core of any collaborative computing environment. Self-service collaborative systems allow collaborators to initiate and create instances of a collaborative environment when and where the collaborators demand a collaborative environment. Self-service collaborative systems further allow collaborators to manage the collaborative resources in the environment on demand without requiring specific expertise outside of the group of collaborative participants in the collaborative community.

The support for self-provisioning of collaborative resources like group workspaces and e-meetings are at the core of the value proposition that collaborative applications bring to the consumer. This capability is a key differentiator of collaborative applications when compared to classical, IT-managed component based Web applications. Still, any application which supports self-service and end user self-provisioning removes the responsibility for creating, granting access, and managing the content and life cycle of shared resources from the hands of the IT department and places this responsibility into the hands of the end-user collaborators.

While the reliance upon collaborators for environment creation and management is intended and desired to support the demand-driven, ad-hoc nature of collaboration, this reliance runs counter to the notion that professional IT managers ought to retain an ability to centrally monitor and restrain the usage of the collaborative environment. Specifically, IT managers ought to maintain control over the collaborative environment in order to prevent excessive use of storage, bandwidth or processor resources as well as to prevent uncontrolled storage of information, expiration of data, unauthorized access or the abuse of the enterprise environment. Thus, collaborative environments seem internally conflicted with the needs and requirements of professional IT management. In particular, the very mechanism intended to relieve IT management from the burden of creating on-demand collaborative environments can burden IT management with addressing the consequences of end-user self-provisioning.

SUMMARY OF THE INVENTION

The present invention addresses the deficiencies of the art in respect to provisioning and managing collaborative contexts in a collaborative environment and provides a novel and non-obvious method, system and apparatus for the policy based provisioning and management of a collaborative context. In accordance with the present invention, a policy-based application provisioning system for use in a collaborative environment can include a policy having rules for limiting collaborative context creation and operation in the collaborative environment. A context provisioning process can be coupled to the policy and configured to create collaborative contexts in the collaborative environment limited by the rules in the policy. Finally, a context management process can be coupled to a data store of usage data for created ones of created collaborative contexts in the collaborative environment.

The context management process can have a configuration for remediating detected violations of the rules in the created ones of the collaborative contexts according to usage data for the created ones of the collaborative contexts. In this regard, the rules of the policy can include at least one rule selected from the group consisting of limitations on resource consumption by created ones of the collaborative contexts, limitations on idleness of created ones of the collaborative contexts, and limitations on resource allocations by collaborators attempting to create collaborative contexts. Also, the context provisioning process can include a communicative coupling to access control logic for limiting collaborator access to provisioning collaborative contexts based upon one of an identity and a role of collaborators attempting to provision collaborative contexts.

A method for policy based application provisioning can include receiving a request to provision a collaborative context in a collaborative environment; loading a policy limiting provisioning of collaborative contexts in the collaborative environment; and, enforcing the policy in handling the request to provision the collaborative context. The method further can include loading an additional policy limiting the lifecycle of provisioned collaborative contexts; and, enforcing the additional policy during the lifecycle of the provisioned collaborative contexts. Notably, the step of enforcing the policy can include the step of denying the request where the policy does not permit provisioning of collaborative contexts by a collaborator issuing the request. Similarly, the step of enforcing the policy can include the step of limiting an allocation of resources in provisioning the collaborative context.

The step of enforcing the additional policy can include loading usage data for the provisioned collaborative contexts; comparing the usage data for each one of the provisioned collaborative contexts to rules in the additional policy; and, when the comparison indicates a violation of the rules in the additional policy, notifying an administrator of the violation. In this regard, the step of enforcing the additional policy can include loading usage data for the provisioned collaborative contexts; comparing the usage data for each one of the provisioned collaborative contexts to rules in the additional policy; and, when the comparison indicates a violation of the rules in the additional policy, remediating the violation.

In a preferred aspect of the invention, the comparing step further can include the step of checking for idleness through the usage data for each one of the provisioned collaborative contexts. Consequently, the remediating step can include removing each idle one of the provisioned collaborative contexts. Alternatively, the remediating step can include the step of notifying an administrator of detected idleness and conditioning the removing step upon approval of the administrator. In the case where idle collaborative contexts are to be removed, the remediating step further can include archiving documents and data from idle ones of the provisioned collaborative contexts before performing the removing step.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is system, method and apparatus for the policy based provisioning and management of a collaborative context. In particular, a dynamically customizable collaborative context can be provided. The dynamically customizable context, referred to herein as a named collaborative space, can include an arrangement of collaborators in a membership defined to pursue a common objective through the use of a collaborative computing environment. The named collaborative space further can include one or more logical components, referred to as collaborative tools, and one or more resources for use by the collaborators through the tools in the collaborative environment. Importantly, roles can be assigned to the collaborators which can limit or enhance access by the collaborators to different tools and resources in the named collaborative space.

The arrangement of collaborators, roles, tools and resources can be specified through a templating mechanism in which the arrangement can be defined in a template, named according to the common objective and processed at the time of creating the named collaborative space to produce the customized collaborative environment. Importantly, unlike the rigid nature of conventional customizable environments, in the named collaborative space of the present invention, any number and type of logical components can be included in the named collaborative space as specified by a template and rendered at run-time in order to produce a highly customizable and flexible collaborative computing environment.

In accordance with the present invention, the named collaborative space can be further extended to include policy based provisioning. Specifically, one or more policies can be defined which can limit the creation of named collaborative spaces and which further can limit the ongoing operation of named collaborative spaces. In the context of creation, the policies can control the types of roles able to create named collaborative spaces and also the amount and type of resources able to be incorporated in the named collaborative spaces. By comparison, in the context of management the policies also can control the usage of resources and also the duration of existence for the named collaborative spaces.

Figure 1:
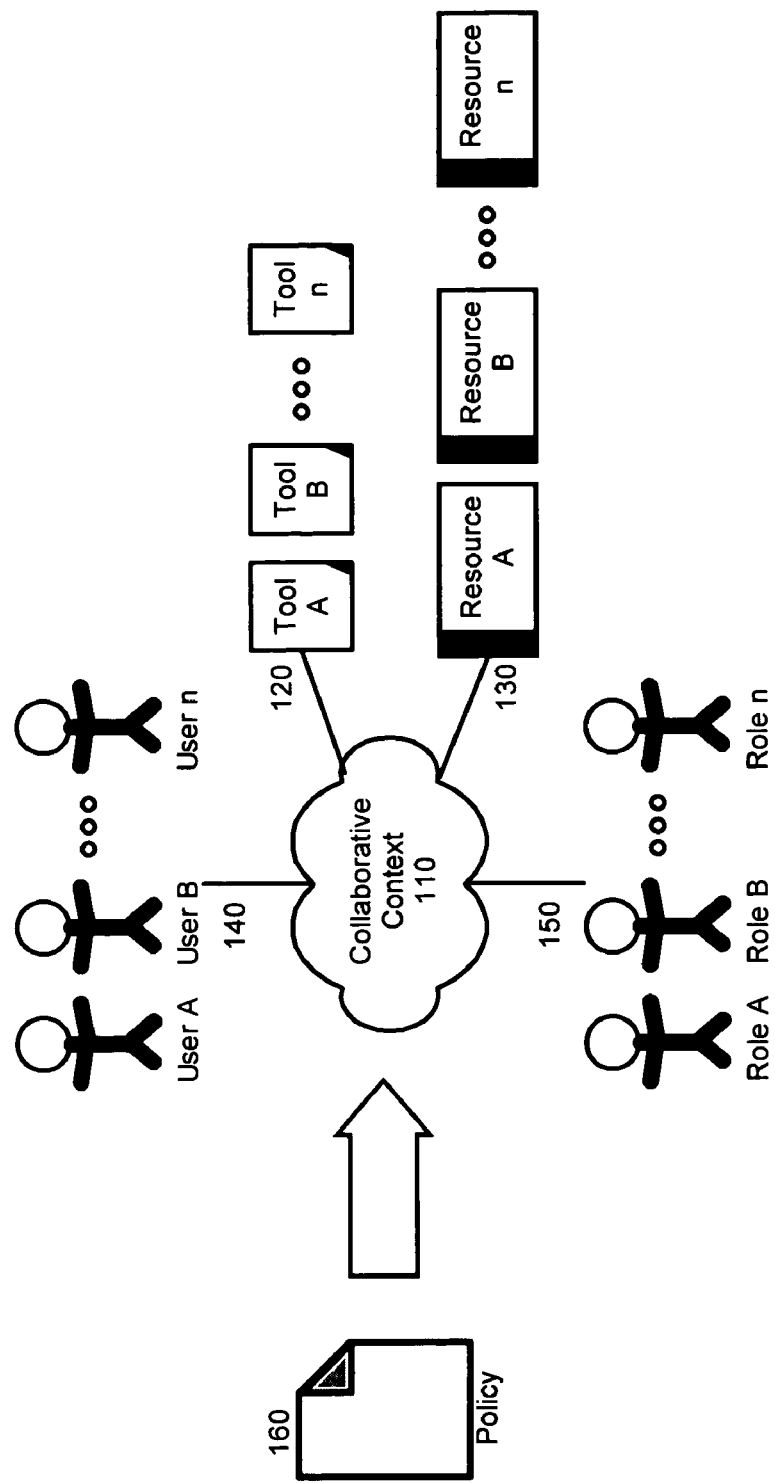
FIG. 1 is a pictorial illustration of a collaborative context configured for policy based provisioning and management.

In further illustration of the general principle of the present invention, FIG. 1 is a pictorial illustration of a collaborative context configured for policy based provisioning and management. The named collaborative space 110 can include an arrangement of collaborators in a membership 140, roles 150 assigned to the collaborators in the membership 140, resources 130 which can be accessed and consumed by the collaborators in the membership 140, and logical components 120 referred to as tools which can be used by the collaborators in the membership 140 for the purpose of working towards the collaborative objective of the named collaborative space 110.

The collaborators in the membership 140 can be computing users defined within a directory structure. The collaborators in the membership 140 can be associated with one or more roles 150. Each of the roles 150 can include permissions associated with collaborators in the membership 140 assigned to the role. The permissions can include which of the tools 120 can be accessed by the collaborators assigned to a specific one of the roles 150, and the extent to which the collaborators in the role can access the tools 120. The roles 150 also can limit which of the resources 130 can be accessed and consumed by the collaborators assigned to the roles 150.

The tools 120 in the named collaborative space 110 can include logical processes, such as self-contained computing applications, servlets, or portlets, which can be formed from a single set of computing logic, or from a composition of multiple sets of computing logic. The tools 120 can include both conventional business logic, as well as other logic, for instance logic for managing the membership 140, the roles 150, and the resources 130. In any case, in a preferred aspect of the present invention, the named collaborative space 110 can be implemented within a portal environment in which the tools 120 can be portlet representations dynamically aggregated within the portal environment. To that end, a template defining the named collaborative space 110 can be processed in the portal aggregator to establish the specified arrangement of tools within the portal view.

According to the present invention, a policy 160 can dictate the creation of the collaborative context 110 by a user in the membership 140. Specifically, the policy 160 can define rules limiting the nature and extent of the collaborative context 110 which can be provisioned by the user in the membership 140. Exemplary rules can include a limitation on the amount of disk storage allocable to the collaborative context 110, a limitation on the communications bandwidth consumed by online collaboration between users in the membership 140, and the capacity of a collaboration in the collaborative context 110, such as the number of users in the membership 140 able to participate in an e-meeting.

The policy 160 of the present invention also can be applied to the ongoing management of the collaborative context 110. In this regard, rules within the policy 160 can be enforced through the ongoing monitoring of the operation of the collaborative context 110. To facilitate the management of the collaborative context 110 during its lifecycle, usage data for the collaborative context 110 can be tracked and compared against the rules of the policy 160. To the extent that any of the usage rules are determined to have been violated (or event to have begun to approach a violation), remedial measures can be undertaken. In all cases, a reporting and notification function further can be provided for the benefit of IT administrators who monitor the operation of the collaborative context.

Figure 2:
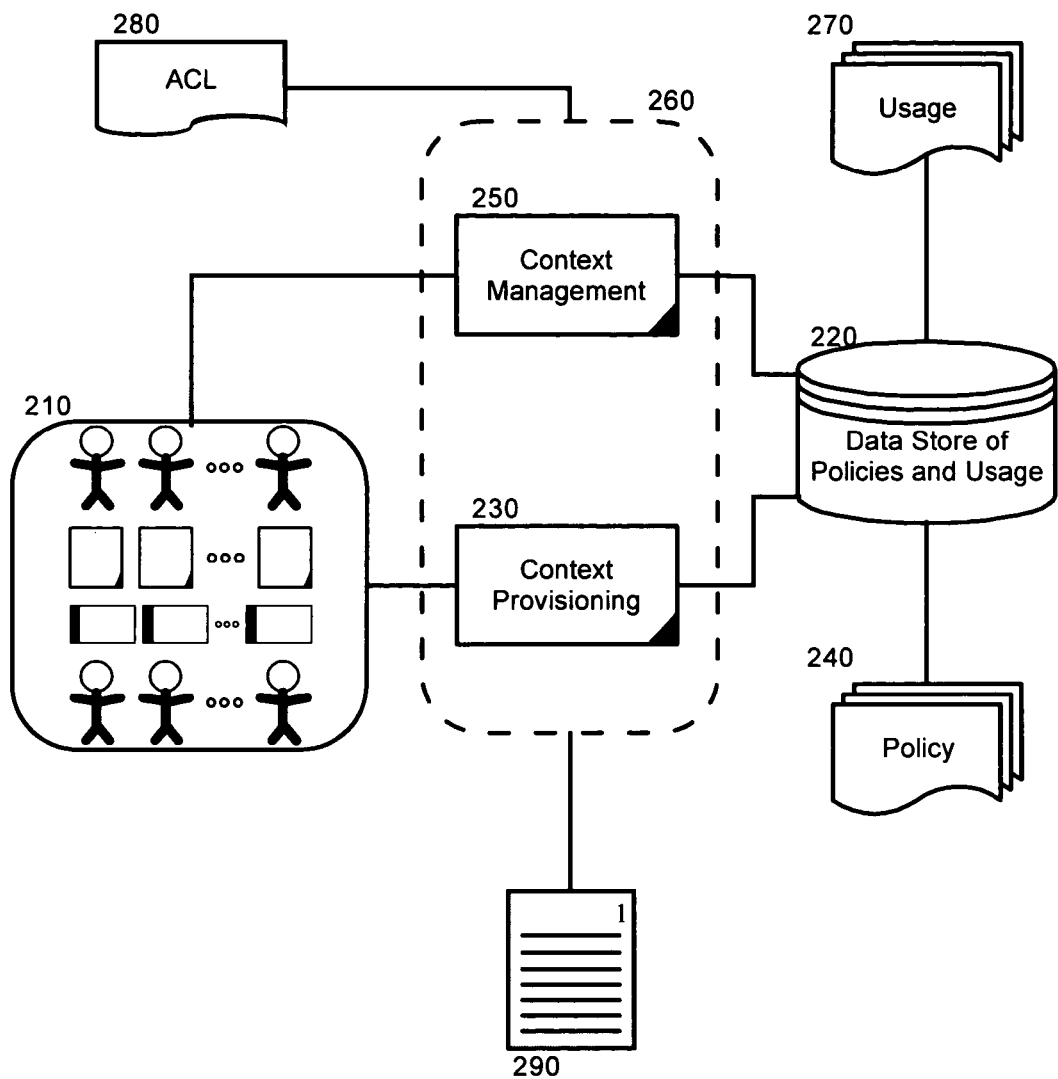
FIG. 2 is a schematic illustration of a system for the policy based provisioning and management of a collaborative context; and, FIG. 3A is a flow chart illustrating a process for the policy based provisioning of a collaborative context in the system of FIG. 2; and, FIG. 3B is a flow chart illustrating a process for the policy based management of a collaborative context in the system of FIG. 2.

FIG. 2 is a schematic illustration of a system for the policy based provisioning and management of a collaborative context. The system can include a policy based application provisioning component 260 coupled to a collaborative environment 210 and having both a context provisioning process 230 and a context management process 250. The policy based application provisioning component 260 can be coupled to one or more data stores 220 configured to store both policy data 240 and also usage data 270. The policy based application provisioning component 260 further can be coupled to access control logic 280 able to regulate access to resources, tools and other users based upon role and user identification information.

The policy data 240 can include a set of rules defining appropriate limitations on the creation and lifecycle for collaborative contexts in the collaborative environment 210 created by individual users within the collaborative environment. The rules defined within the policy data 240 can include, by way of example, limitations on the amount of resources allocated or consumed by a created collaborative context, whether or not a particular user or role can create a collaborative context, the length of idle time during which a created collaborative context can remain viable without being destroyed, and the number of users in the collaborative context permitted to be accommodated by tools disposed within the created collaborative content in the collaborative environment 210.

The usage data 270, by comparison, can include tracked statistics for a created collaborative context in the collaborative environment 210. The usage data 270 can include, by way of example, the number and identity of users participating in the created collaborative context, the idle time during which the created collaborative context has not been accessed by any of the collaborators named to the created collaborative context, and the amount of resources consumed by the created collaborative context, either or both in the aggregate and at particular moments in time. To that end, the context management process 250 can monitor the operation of the created collaborative context in the collaborative environment 210 in order to update the usage data 270 periodically. Of course, the skilled artisan will recognize that other external processes independent of the system of the present invention can serve the objective of updating the usage data 270 without burdening the context management process 250.

Importantly, the context provisioning process 230 can be configured to limit the creation of a collaborative context on behalf of a collaborator in the collaborative environment 210 based upon the provisioning rules specified in the policy data 240. Specifically, when a collaborator chooses to create an ad-hoc collaborative context, the context provisioning process 230 can compare the identity of the collaborator to the restrictions placed upon the collaborator in the access control logic 280. If the collaborator is permitted to access the context provisioning logic of the collaborative environment 210, the context provisioning process 230 can load the policy rules in the policy data 240 which are applicable to the collaborator. Based upon the rules specified in the policy data 240, the context provisioning process 230 can apply limitations upon the nature and the extent of the collaborative context created by the collaborator.

By comparison, the context management process 250 can manage the lifecycle of already created collaborative contexts through an inspection both of the usage data 270 for the collaborative contexts and policy data 240 which can be applied to the collaborative contexts. In particular, the context management process 250 can view the usage data 270 for the collaborative contexts for comparison to the rules of the policy data 240. To the extent that any of the rules of the policy data 240 have been violated, remedial measures can be undertaken. In this regard, the remedial measures can include a mere notification of an outside administrator or the administrating collaborator, or the production of a report through a reporting tool 290.

To the extent that the violated rules relate to the idleness of the collaborative context, the collaborative context can be removed from the collaborative environment 210 and the resources consumed thereby, freed for allocation to other computing processes in the environment. Still, to the extent that the collaborative context includes data and documentation produced collaboratively by the collaborators in the context, it would be preferable that the collaborative context cannot be removed automatically without providing an archival feature for the data and documentation. Furthermore, in a preferred aspect of the invention, the administering collaborator for the stale collaborative context can be afforded an opportunity to cure the violation without resulting in the automatic destruction of the collaborative context.

Figure 3A:
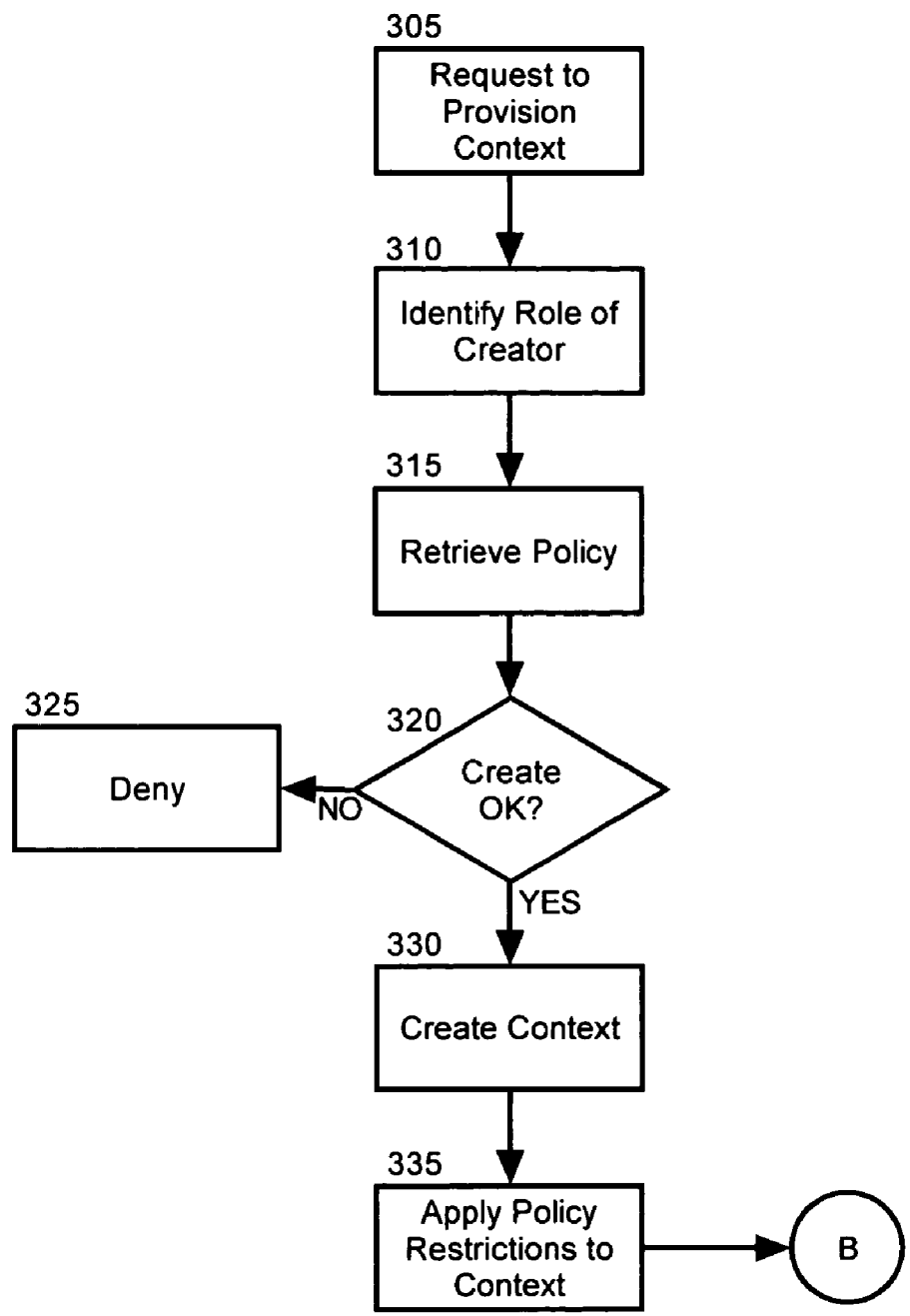

To further illustrate the operation of the policy based application provisioning system 260 of FIG. 2, FIG. 3A is a flow chart illustrating a process for the policy based provisioning of a collaborative context. Beginning in block 305, a request can be received in the policy based application provisioning system to provision a collaborative context according to a templated specification for the context. The templated specification can include a listing of tools, resources, collaborators and respective roles to be included in the collaborative context. Notably, additional, non-templated data can be provided to indicate selected resource requirements and parameters for the collaborative context.

In block 310, the role of the creating collaborator can be retrieved as can the policy for creating collaborative contexts in block 315. Preliminarily, in decision block 320 it can be determined whether the collaborator is permitted to create collaborative contexts in an ad-hoc fashion. If not, the request to create the collaborative context can be denied in block 325.

Otherwise, in block 330 the collaborative context can be created. Subsequently, in block 335 particular restrictions specified in the policy can be applied to the created context, including time limitations on the existence of the context, time limitations on the permitted idleness of the context, resource allocation and usage limitations and membership limitations. In any case, leading through jump circle B, once the context has been created, the context can be managed according to the rules of the policy as shown in FIG. 3B.

Figure 3B:
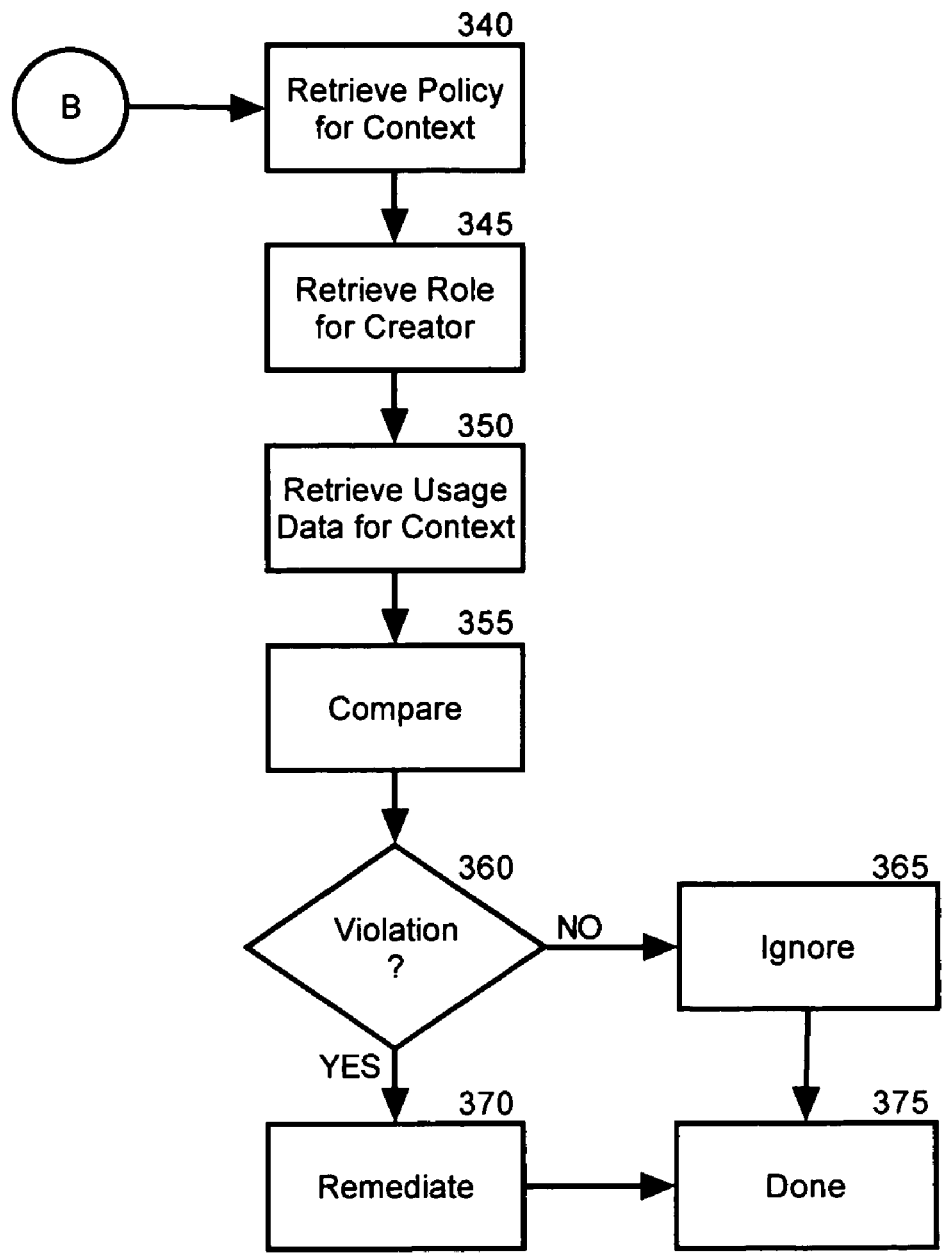

FIG. 3B is a flow chart illustrating a process for the policy based management of a collaborative context in the system of FIG. 2. Beginning in block 340, the policy can be retrieved for the existing collaborative context. Similarly, in block 345 the role for the creating collaborator can be retrieved as can the usage data for the created collaborative context in block 350. In block 355, the usage data for the context can be compared to the rules in the policy applied in respect to the role of the creating collaborator. If in decision block 360 one or more of the rules of the policy are determined to have been violated, in block 370 remedial measures can be undertaken. Otherwise, the state of the context expressed in the usage data can be ignored in block 365 and the process can end in block 375.

Notably, the policy based application provisioning system can provide a user interface for managing the ongoing lifecycle of the created collaborative context. The user interface can present a composite view of the lifecycle of the collaborative context including resource based usage reporting, and rule violation reporting. The user interface also can be provide a mechanism for the manual management of the collaborative context, including the deleting and archiving of stale contexts, the querying of contexts for particular resources, the personalized viewing of member contexts, and even the billing of resource usages to organization entities utilizing the contexts.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A policy based application provisioning system for use in a collaborative environment, the system comprising:

A computer; a memory, the memory containing instructions that when executed by the computer causes the computer to perform the process of:

creating a policy comprising rules for limiting collaborative context creation and operation in the collaborative environment;

creating by a context provisioning process coupled to said policy a collaborative context in the collaborative environment limited by said rules in said policy; and detecting violations of said rules in said created ones of said collaborative contexts according to usage data for said created ones of said collaborative contexts, remediating, by a context management process coupled to a data store of usage data for created ones of created collaborative contexts in the collaborative environment, detected violations of said rules in said created ones of said collaborative contexts according to usage data for said created ones of said collaborative contexts.

2. The system of claim 1, wherein said rules of said policy comprise at least one rule selected from the group consisting of limitations on resource consumption by created ones of said collaborative contexts, limitations on idleness of created ones of said collaborative contexts, and limitations on resource allocations by collaborators attempting to create collaborative contexts.

3. The system of claim 1, further comprising a billing component configured to bill organization entities for resource usage evident from said usage data.

4. The system of claim 1, wherein said context provisioning process comprises a communicative coupling to access control logic for limiting collaborator access to provisioning collaborative contexts based upon one of an identity and a role of collaborators attempting to provision collaborative contexts.

5. A method for policy based application provisioning, the method comprising the steps of:

creating by a computer system a policy comprising rules for limiting collaborative context creation and operation in the collaborative environment;

creating by a computer system a context provisioning process coupled to said policy a collaborative context in the collaborative environment limited by said rules in said policy; and detecting by a computer system violations of said rules in said created ones of said collaborative contexts according to usage data for said created ones of said collaborative contexts, remediating, by a computer system a context management process coupled to a data store of usage data for created ones of created collaborative contexts in the collaborative environment, detected violations of said rules in said created ones of said collaborative contexts according to usage data for said created ones of said collaborative contexts.

6. The method of claim 5, further comprising the steps of:

loading an additional policy limiting the lifecycle of provisioned collaborative contexts; and, enforcing said additional policy during the lifecycle of said provisioned collaborative contexts.

7. The method of claim 5, wherein said step of remediating said policy comprises the step of denying said request where said policy does not permit provisioning of collaborative contexts by a collaborator issuing said request.

8. The method of claim 5, wherein said step of remediating said policy comprises the step of limiting an allocation of resources in provisioning said collaborative context.

9. The method of claim 6, wherein said step of enforcing said additional policy comprises the steps of:
- loading usage data for said provisioned collaborative contexts;
- comparing said usage data for each one of said provisioned collaborative contexts to rules in said additional policy; and,
- when said comparison indicates a violation of said rules in said additional policy, notifying an administrator of said violation.

10. The method of claim 6, wherein said step of enforcing said additional policy comprises the steps of:
- loading usage data for said provisioned collaborative contexts;
- comparing said usage data for each one of said provisioned collaborative contexts to rules in said additional policy; and,
- when said comparison indicates a violation of said rules in said additional policy, remediating said violation.

11. The method of claim 10, wherein said comparing step further comprises the step of checking for idleness through said usage data for each one of said provisioned collaborative contexts.

12. The method of claim 11, wherein said remediating step comprises the step of removing each idle one of said provisioned collaborative contexts.

13. The method of claim 12, wherein said remediating step further comprises the step of notifying an administrator of detected idleness and conditioning said removing step upon approval of said administrator.

14. The method of claim 13, wherein said remediating step further comprises the step of archiving documents and data from idle ones of said provisioned collaborative contexts before performing said removing step.

15. A machine readable storage having stored thereon a computer program for policy based application provisioning, the computer program comprising a routine set of instructions which when executed by a machine cause the machine to perform the steps of:
- creating a policy comprising rules for limiting collaborative context creation and operation in the collaborative environment;
- creating by a context provisioning process coupled to said policy a collaborative context in the collaborative environment limited by said rules in said policy; and
- detecting violations of said rules in said created ones of said collaborative contexts according to usage data for said created ones of said collaborative contexts remediating, by a context management process coupled to a data store of usage data for created ones of created collaborative contexts in the collaborative environment, detected violations of said rules in said created ones of said collaborative contexts according to usage data for said created ones of said collaborative contexts.

16. The machine readable storage of claim 15, further comprising the steps of:
- loading an additional policy limiting the lifecycle of provisioned collaborative contexts; and,
- enforcing said additional policy during the lifecycle of said provisioned collaborative contexts.

17. The machine readable storage of claim 15, wherein said step of remediating said policy comprises the step of denying said request where said policy does not permit provisioning of collaborative contexts by a collaborator issuing said request.

18. The machine readable storage of claim 15, wherein said step of remediating said policy comprises the step of limiting an allocation of resources in provisioning said collaborative context.

19. The machine readable storage of claim 16, wherein said step of enforcing said additional policy comprises the steps of:
- loading usage data for said provisioned collaborative contexts;
- comparing said usage data for each one of said provisioned collaborative contexts to rules in said additional policy; and,
- when said comparison indicates a violation of said rules in said additional policy, notifying an administrator of said violation.

20. The machine readable storage of claim 16, wherein said step of enforcing said additional policy comprises the steps of:
- loading usage data for said provisioned collaborative contexts;
- comparing said usage data for each one of said provisioned collaborative contexts to rules in said additional policy; and,
- when said comparison indicates a violation of said rules in said additional policy, remediating said violation.

21. The machine readable storage of claim 20, wherein said comparing step further comprises the step of checking for idleness through said usage data for each one of said provisioned collaborative contexts.

22. The machine readable storage of claim 21, wherein said remediating step comprises the step of removing each idle one of said provisioned collaborative contexts.

23. The machine readable storage of claim 22, wherein said remediating step further comprises the step of notifying an administrator of detected idleness and conditioning said removing step upon approval of said administrator.

24. The machine readable storage of claim 23, wherein said remediating step further comprises the step of archiving documents and data from idle ones of said provisioned collaborative contexts before performing said removing step.

* * * * *